(12) United States Patent
Huhtasalo

(10) Patent No.: US 12,282,911 B2
(45) Date of Patent: Apr. 22, 2025

(54) METHOD AND ARRANGEMENT FOR RECYCLING A PACKAGING PURCHASED FROM A SMART FRIDGE

(71) Applicant: Intelligent Fridges B.V., Nieuw-Vennep (NL)

(72) Inventor: Lauri Huhtasalo, Tampere (FI)

(73) Assignee: Intelligent Fridges B.V, Nieuw-Vennep (NL)

( * ) Notice: Subject to any disclaimer, the term of this patent is extended or adjusted under 35 U.S.C. 154(b) by 230 days.

(21) Appl. No.: 17/415,882

(22) PCT Filed: Dec. 19, 2019

(86) PCT No.: PCT/IB2019/061078
§ 371 (c)(1),
(2) Date: Jun. 18, 2021

(87) PCT Pub. No.: WO2020/128937
PCT Pub. Date: Jun. 25, 2020

(65) Prior Publication Data
US 2022/0076237 A1    Mar. 10, 2022

(30) Foreign Application Priority Data
Dec. 20, 2018  (SE) .................................. 1851627-8

(51) Int. Cl.
*G06Q 10/30*  (2023.01)
*G06Q 20/20*  (2012.01)
(Continued)

(52) U.S. Cl.
CPC ......... *G06Q 20/3276* (2013.01); *G06Q 10/30* (2013.01); *G06Q 20/20* (2013.01); *G07F 9/026* (2013.01)

(58) Field of Classification Search
CPC .... G06Q 20/3276; G06Q 20/20; G06Q 10/30; G07F 9/026
(Continued)

(56) References Cited

U.S. PATENT DOCUMENTS 9,245,404 B1 * 1/2016 Martuch ............... G07F 7/0609
9,349,238 B2 * 5/2016 Tkachenko ........ G06Q 30/0202
(Continued)

FOREIGN PATENT DOCUMENTS

CN    202816018 U  *  3/2013
CN    203573408 U  *  4/2014
(Continued)

OTHER PUBLICATIONS

Dumpayan, "Two-way powered microcontroller-based plastic bottles 'drop-and-tap' reverse vending machine with stored value system using radio frequency identification (RFID) scanner technology", https://ieeexplore.ieee.org/document/8269433, 2017 (Year: 2017).*
(Continued)

*Primary Examiner* — Paul S Schwarzenberg
*Assistant Examiner* — Mark A Malkowski
(74) *Attorney, Agent, or Firm* — N.V. Nederlandsch Octrooibureau

(57) ABSTRACT

Method for purchasing a product with a packaging from a smart fridge and recycle the packaging, wherein the method comprising the steps of identifying the consumer, unlocking a door of the smart fridge, opening the door, closing and locking the door, running a system inventory round in to detect which product that has been picked out from the smart fridge by the consumer, and charging the cost for the product from the consumer's payment account and sending a receipt to the mobile device. The invention is characterized in that the method further comprising the steps of placing the RFID tagged packaging in a smart recycling bin, detecting the
(Continued)

RFID tag of the packaging via an RFID reader at the recycling bin, connecting the packaging to the consumer, and refunding the consumer for placing the product packaging in the recycling bin.

1 Claim, 1 Drawing Sheet

(51) Int. Cl.
*G06Q 20/32* (2012.01)
*G07F 9/02* (2006.01)

(58) Field of Classification Search
USPC .......................................................... 705/44
See application file for complete search history.

(56) References Cited

U.S. PATENT DOCUMENTS

| | | |
|---|---|---|
| 2005/0216120 A1 | 9/2005 | Rosenberg et al. |
| 2005/0246225 A1 | 11/2005 | Jorgensen |
| 2006/0069588 A1* | 3/2006 | Ritter ............... G06Q 20/10 705/308 |
| 2006/0187058 A1* | 8/2006 | Regard ............. G06Q 20/203 340/572.8 |
| 2007/0219862 A1 | 9/2007 | Casella et al. |
| 2008/0100416 A1* | 5/2008 | Harper ............ G06Q 10/0637 340/5.7 |
| 2009/0140000 A1 | 6/2009 | Davis, Jr. |
| 2010/0198671 A1 | 8/2010 | Prabhakar et al. |
| 2013/0228623 A1 | 9/2013 | Virella |
| 2014/0012765 A1 | 1/2014 | Kruglick |
| 2014/0103062 A1 | 4/2014 | Rose, Jr. et al. |
| 2014/0214505 A1* | 7/2014 | Shuster-Arechiga ....................... G06Q 30/0208 705/308 |
| 2014/0316561 A1 | 10/2014 | Tkachenko et al. |
| 2015/0235184 A1* | 8/2015 | Hunscher ............... G06Q 99/00 705/308 |
| 2015/0375984 A1 | 12/2015 | Arcand |
| 2017/0011384 A1 | 1/2017 | Tkachenko et al. |
| 2017/0124643 A1 | 5/2017 | Haimi et al. |
| 2018/0182052 A1* | 6/2018 | Panagos ................ G06F 21/604 |
| 2019/0138977 A1* | 5/2019 | Essenmacher ....... G06Q 10/087 |
| 2023/0011232 A1* | 1/2023 | Moonier .................. E05B 9/08 |

FOREIGN PATENT DOCUMENTS

| | | | | |
|---|---|---|---|---|
| CN | 107944539 A | | 4/2018 | |
| CN | 207704532 U | | 8/2018 | |
| CN | 207799790 U | | 8/2018 | |
| CN | 213300565 U | * | 5/2021 | |
| KR | 20140059978 A | * | 5/2014 | .......... G06V 40/168 |
| TW | 201426585 A | | 7/2014 | |
| WO | 02089078 A1 | | 11/2002 | |
| WO | 2005118435 A1 | | 12/2005 | |
| WO | 2009021228 A1 | | 2/2009 | |
| WO | WO-2013184217 A1 | * | 12/2013 | ............ G06Q 10/30 |
| WO | 2015076949 A1 | | 5/2015 | |

OTHER PUBLICATIONS

Extended European Search Report from corresponding European application No. 19901297.2, dated Aug. 25, 2022.
International Search Report from corresponding PCT application No. PCT/IB2019/061078 mailed Mar. 27, 2020.
Office Communication from corresponding European application No. 19901297.2, dated Nov. 7, 2024.

* cited by examiner

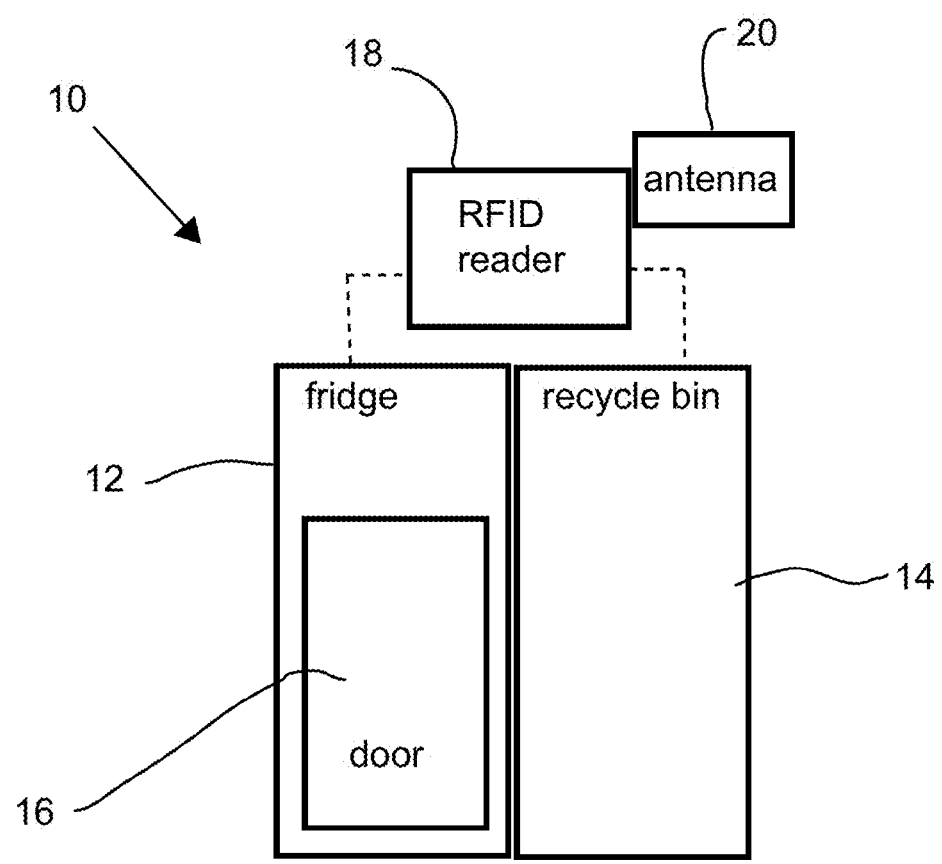

ated Application No. PCT/IB2019/061078,
METHOD AND ARRANGEMENT FOR RECYCLING A PACKAGING PURCHASED FROM A SMART FRIDGE This application is a U.S. National Phase under 35 U.S.C. § 371 of International Application No. PCT/IB2019/061078, filed Dec. 19, 2019, which claims priority under 35 U.S.C. §§ 119 and 365 to Swedish Application No. 1851627-8, filed Dec. 20, 2018.

TECHNICAL FIELD

The present invention relates to a method for purchasing a product with a packaging from a smart fridge and recycling the product packaging of the product, the method comprising the steps of:
identifying of a consumer,
unlocking a door of the smart fridge,
opening the door, such that the consumer can pick out desired product with a packaging from the smart fridge, wherein each product packaging is tagged with an RFID tag having an individual identification code,
closing and locking the door,
running a system inventory round to detect which product has been picked out from the smart fridge by the consumer, and
charging the cost for the product from the consumer's payment account.

The present invention also relates to an arrangement for purchasing a product with a packaging and recycling the packaging waste of the product, the arrangement comprising:
a smart fridge comprising:
a storage for products with RFID tagged packaging,
an identification system for identifying a consumer,
a lockable door that is openable after identification of the consumer, and
an RFID reader and an antenna for reading the RFID tagged products in the smart fridge's storage, the RFID reader connected to a software system detecting and identifying which products that have been removed from the smart fridge, such that the system can charge the consumer's personal payment account.

Background—Problem

There is currently a huge boom going on to develop and deploy so called unmanned retail store fridges, in the following these will be named "smart fridges".

Smart fridges are used to sell, in an automated way, various products such as consumer products, groceries, beverages, snacks etc. Each product in the smart fridge is equipped with an RFID tag.

The shopping process in a smart fridge is typically the following:

Identification of a consumer, typically done by a consumer using his smartphone to scan a QR code on a display of the smart fridge. The QR code launches a mobile app (such as Alipay, Wechat Pay, MobilePay or Swift) on the consumer's mobile device (e.g. smartphone), thus identifying the consumer and connecting to the consumer's personal payment account.

When the consumer has been identified, the system will send a command to an electric lock of the smart fridge to open the locked door.

The consumer will open the door and pick out the products he wants to purchase and will then close the door.

When the door is closed, the system will run an inventory round inside the fridge. Since each product is RFID tagged with tags with individual identification codes (for example Electronic Product Code, "EPC" or Unique Identifier ("UID")), the system will detect which products are inside the fridge.

The system will display the purchased items and their cost on the smart fridge display.

The system will charge the corresponding amount from the consumer's payment account and send a receipt to his mobile device.

The system always knows the inventory of the smart fridge. When the inventory levels are low enough, the system will trigger a replenishment cycle. Therefore, a replenishment batch of products will be delivered to the smart store fridge from a centralized warehouse or distribution centre.

This is very convenient and will increase dramatically the retail item sales in multiple locations such as office buildings.

However, this also creates a problem—as more and more packaging waste will be generated to these locations. Such packaging waste generated by smart store fridges or smart kiosks include aluminium beverage cans, glass bottles and other packaging waste which could provide valuable raw material for new products if it could be recirculated.

Right now, in many countries, such packaging wastes are not recycled as there is no incentive for the consumer to return the packaging waste to the recirculation. There is also often no easy and economical way to organize the return logistics of such packaging waste.

OBJECT OF INVENTION

An object with the invention is to present an inventive method and arrangement that facilitates the recycling of packaging waste and in addition creates an incentive for the consumer to recycle the packaging.

BRIEF DESCRIPTION OF THE DRAWINGS

FIG. 1 schematically depicts an arrangement according to one or more embodiments of the present invention.

SUMMARY OF THE INVENTION

The inventive method is characterized in that the method further comprises the steps of:
placing the RFID tagged packaging in a smart recycling bin,
detecting the RFID tag of the packaging via an RFID reader at the recycling bin,
connecting the packaging to the consumer, and
refunding the consumer for placing the product packaging in the recycling bin.

The inventive arrangement is characterized in that the arrangement further comprises:
a smart recycle bin comprising:
a packaging waste point for placing the RFID tagged packaging waste of the product, and
an RFID reader and an antenna for reading the RFID tag, the smart recycle bin connected to the same software system as the smart fridge, such that the system will know who purchased the product and thereby can refund a certain payback to the consumer's payment account.

DETAILED DESCRIPTION OF THE INVENTION

In accordance with the invention, with reference to FIG. 1, an arrangement 10 is used for purchasing a product with a packaging and recycling the packaging waste of the product.

The arrangement 10 comprising a smart fridge 12 and a smart recycling bin 14.

The smart fridge 12 comprises a purchase identification system for identifying the consumer and connecting to the consumer's personal payment account. This is typically done by a consumer using his personal mobile device, e.g. a smartphone, to scan a QR code shown on the smart fridge display. The QR code launches a mobile app (e.g. Alipay, Wechat Pay, MobilePay, Swift or similar) on the mobile device and thus identifies the consumer. However, the skilled person realizes that other types of identifying methods are possible e.g. via the consumer's credit card.

The smart fridge further comprises a storage for RFID tagged products. Each product has a package, wherein each product packaging is equipped with an RFID tag with individual identification codes (for example Electronic Product Code, "EPC" or Unique identifier "UID").

The smart fridge further comprises a lockable door 16, which is openable after identification of the consumer.

Finally, the smart fridge 12 comprises an RFID reader 18 and an antenna for reading the RFID tagged products in the storage of the smart fridge 12.

The RFID reader 12 is connected to a software system of the smart fridge, such that the system can detect and identify what products are inside the smart fridge. As the system also knows what items are inside the fridge before the consumer opens the door, it can deduct which products the consumer took out (=purchased). And based on this algorithm, the system consequently knows which exact product ID's the consumer purchased.

The smart recycle bin 14 comprises a packaging waste collection point for placing the packaging waste of the product in after the consumer has consumed the product.

The collection point can be next to the smart fridge 12 or integrated with the smart fridge 12 or it can be elsewhere in the building or area.

The smart recycle bin 14 further comprises an RFID reader 18 and an antenna 20. The RFID reader 18 will read the RFID tag in the packaging waste. The RFID reader 18 is connected to the same software system as the smart fridge. The RFID reader 18 may even be the same reader as is used in the smart fridge 12, in those cases the smart recycle bin 14 is located next to the smart fridge 12.

Also, in accordance with the invention, an inventive method is used for purchasing a product with a packaging and recycling the packaging waste of the product.

The inventive method comprises the following steps:

Identifying the consumer via the consumer's mobile device, e.g. a smartphone. A preferred method is that the consumer uses his smartphone to scan a QR code shown on the smart fridge. The QR code launches a mobile app (such as Alipay, Wechat Pay, MobilePay, Swift or similar) on the consumer's mobile device and connects to the consumer's personal payment account. However, the skilled person realizes that other types of identifying methods are possible e.g. via the consumer's credit card.

After identifying of the consumer, the system will unlock the locked door to the smart fridge, such that the consumer can open the door. When the door is open the consumer can pick out desired products with packaging from the smart fridge. Each product packaging is equipped with an RFID tag with individual identification codes (for example Electronic Product Code, "EPC" or Unique identifier "UID"). Thereafter, the consumer closes the door and the door locks automatically.

When the door is locked the system will automatically run an inventory round to detect which products with packaging that have been picked out from the smart fridge by the consumer.

The system will thereafter automatically charge the cost for the purchased products from the consumer's payment account and send a receipt to the mobile device.

After the consumer has consumed the product (for example a can of coca cola or snacks), he will return the packaging waste (for example empty can, paper or plastic) to the package waste collection point. The collection point can be next to the Smart Fridge or integrated with the Smart Fridge (even utilizing the same reader unit) or it can be elsewhere in the building or area. The packaging waste collection bin includes an RFID reader and an antenna which are connected to the same software system as the smart fridge. The RFID reader will detect and identify the RFID tag of the packaging waste.

The system will detect the RFID tag of the packaging via an RFID reader in the smart recycle bin. The RFID reader is connected to the same software system as the RFID reader at the smart fridge, such that the system will know who originally purchased the product with packaging. Based on this, the system will refund a certain payback to the consumer's payment account.

By detecting the individual code of the package (i.e. EPC or UID or other unique code), the system will know who originally purchased this package/product. Based on this, the system can refund certain costs back to the consumer's payment account. This creates an incentive for the consumer to bring back the packaging waste. (Possibly the system does not need to directly give monetary refund to the consumer, it could be other kind of incentive such as bonus points etc.)

Note, it is of course possible that the consumer identifies himself (with the same QR code reading based process) when he returns the packaging to the waste collection point. This way the refund can be given to the person who returns the packages, and not to the person who purchased the packages. However, such an embodiment is not part of the claimed invention.

When the replenishment operator brings new products to the smart fridge, he will during the same round also collect back the packaging waste, and bring it to the warehouse or distribution centre, for further sales towards the packaging waste reusing companies.

Some benefits with the invention:

The consumer does not need to register himself before he places the packaging waste in the recycle bin, since this was already done at the purchasing of the product.

Incentive for the consumer to recycle his packaging waste, since it will give him a payback in return.

The payback will come to the consumer who bought the product directly after the package is placed in the bin. Hence, no additional registration is needed.

Improve the packaging waste reuse and recycling percentages in countries which don't yet have such packaging waste refund systems in place. Often these countries would have the biggest volumes and gains from such systems.

Such environmental friendliness also improves the reputation and acceptance of the smart fridge concept.

Easier and lower cost for housekeeping of the building as part of packaging waste is removed by smart fridge operator company.

Smart fridge operator company will get compensated for the package waste when they sell it as raw material for another company.

Total cost of replenishment process is reduced as the replenishment operator is doing value added work during all his movement-going into the building and coming out of the building.

In the foregoing, the invention has been described based on some specific preferred embodiments. It is appreciated, however, that other embodiments and variants are possible within the scope of the following claims. For example, the skilled person realizes that other types of identification of the consumer are possible e.g. via the consumer's credit card or identification card etc. However, an identification via the mobile device is preferred.

The invention claimed is:

1. An arrangement for purchasing a product with a packaging and recycling the packaging of the product, wherein the arrangement comprises:
   a smart fridge comprising:
      a storage for products with RFID tagged packaging,
      an identification system for identifying a consumer,
      a lockable door that is configured to be opened after identification of the consumer, the lockable door comprising an electric lock, wherein the smart fridge automatically locks the door after the door is closed, and
      an RFID reader and an antenna for reading the products with RFID tagged packaging in the storage, the RFID reader connected to a software system for detecting and identifying which products that have been removed from the smart fridge, such that the software system charges a personal payment account of the consumer,
   wherein the arrangement further comprises:
      a smart recycle bin comprising:
         a packaging waste point for placing the products with RFID tagged packaging, and
         the RFID reader and the antenna for reading the RFID tag, the smart recycle bin connected to the same software system as the smart fridge, such that the software system identifies which consumer purchased the product and thereby refunds a certain payback to the payment account of the consumer,
      wherein the smart fridge and the smart recycle bin are connected to the RFID reader to read the RFID tag, and the smart recycle bin is located next to the smart fridge.

* * * * *